US010805643B2

(12) United States Patent
Amer et al.

(10) Patent No.: US 10,805,643 B2
(45) Date of Patent: Oct. 13, 2020

(54) ADAPTIVE ERROR-CONTROLLED DYNAMIC VOLTAGE AND FREQUENCY SCALING FOR LOW POWER VIDEO CODECS

(71) Applicants: ADVANCED MICRO DEVICES, INC., Santa Clara, CA (US); ATI TECHNOLOGIES ULC, Markham (CA)

(72) Inventors: Ihab Amer, Stouffville (CA); Gabor Sines, Toronto (CA); Khaled Mammou, Vancouver (CA); Haibo Liu, North York (CA); Arun Sundaresan Iyer, Bangalore (IN)

(73) Assignees: ADVANCED MICRO DEVICES, INC., Sunnyvale, CA (US); ATI TECHNOLOGIES ULC, Markham (CA)

( * ) Notice: Subject to any disclaimer, the term of this patent is extended or adjusted under 35 U.S.C. 154(b) by 758 days.

(21) Appl. No.: 15/085,562

(22) Filed: Mar. 30, 2016

(65) Prior Publication Data
US 2017/0289577 A1  Oct. 5, 2017

(51) Int. Cl.
*G06F 1/32* (2019.01)
*H04N 19/895* (2014.01)
*H04N 19/66* (2014.01)
*H04N 19/70* (2014.01)

(52) U.S. Cl.
CPC .......... *H04N 19/895* (2014.11); *H04N 19/66* (2014.11); *H04N 19/70* (2014.11)

(58) Field of Classification Search
CPC ....... H04N 19/895; H04N 19/70; H04N 19/66
See application file for complete search history.

(56) References Cited

U.S. PATENT DOCUMENTS

| 6,035,126 | A  | * | 3/2000 | Wise ...................... G06F 9/3867 375/E7.093 |
| 6,300,973 | B1 | * | 10/2001 | Feder ..................... H04N 7/152 348/14.09 |
| 7,010,030 | B2 | * | 3/2006 | Vaidyanathan ... H04L 25/03057 375/232 |
| 7,046,694 | B2 | * | 5/2006 | Kumar ................... H04H 20/30 370/487 |
| 7,991,055 | B2 | * | 8/2011 | Cancemi .......... H04N 21/23608 375/240.12 |
| 8,027,387 | B2 | * | 9/2011 | Morimoto ............ H04N 19/176 375/240.2 |

(Continued)

OTHER PUBLICATIONS

Dan Ernst et al.; *Razor: Circuit-Level Correction of Timing Errors for Low-Power Operation*; IEEE Micro; Nov.-Dec. 2004; pp. 10-20.

(Continued)

*Primary Examiner* — Philip P. Dang

(57) ABSTRACT

Various codecs and methods of using the same are disclosed. In one aspect, a method of processing video data is provided that includes encoding or decoding the video data with a codec in aggressive deployment and correcting one or more errors in the encoding or decoding wherein the error correction includes re-encoding or re-decoding the video data in a non-aggressive deployment or generating a skip picture.

21 Claims, 9 Drawing Sheets

(56) References Cited

U.S. PATENT DOCUMENTS

| | | | |
|---|---|---|---|
| 8,037,430 B2* | 10/2011 | Papanikolaou | G06F 17/5009 716/56 |
| 8,102,920 B2* | 1/2012 | Suh | H04H 60/13 375/240.27 |
| 8,270,807 B2* | 9/2012 | Sasaki | G11B 27/105 386/246 |
| 8,436,889 B2* | 5/2013 | Eleftheriadis | H04N 7/152 348/14.09 |
| 8,516,529 B2* | 8/2013 | Lajoie | H04L 65/1016 709/201 |
| 8,547,484 B2 | 10/2013 | Inohiza | |
| 8,615,581 B2* | 12/2013 | Dare | H04L 41/0253 370/352 |
| 8,861,940 B2* | 10/2014 | Sasaki | G11B 27/105 386/341 |
| 9,014,277 B2* | 4/2015 | Rabii | H04N 19/176 370/280 |
| 9,049,042 B2* | 6/2015 | Tagg | H04L 12/2856 |
| 9,060,175 B2* | 6/2015 | Wang | H04N 19/105 |
| 9,072,107 B2* | 6/2015 | Gauvreau | H04L 5/0053 |
| 9,226,193 B2* | 12/2015 | Smith | H04W 28/0289 |
| 2002/0184373 A1* | 12/2002 | Maes | G10L 15/30 709/228 |
| 2005/0008240 A1* | 1/2005 | Banerji | H04N 5/2624 382/238 |
| 2011/0032328 A1 | 2/2011 | Raveendran et al. | |
| 2012/0026288 A1* | 2/2012 | Tourapis | H04N 19/70 348/43 |
| 2012/0066526 A1 | 3/2012 | Salsbery et al. | |
| 2013/0010863 A1* | 1/2013 | Wu | H04N 21/8451 375/240.12 |
| 2013/0166580 A1* | 6/2013 | Maharajh | H04L 65/605 707/758 |
| 2014/0010282 A1* | 1/2014 | He | H04N 21/23439 375/240.02 |

OTHER PUBLICATIONS

Jan M. Rabaey; *Optimizing Power @ Runtime, Circuits and Systems*; Low Power Design Essentials Chapter 10; 2008 pp. 1-69.

* cited by examiner

ADAPTIVE ERROR-CONTROLLED DYNAMIC VOLTAGE AND FREQUENCY SCALING FOR LOW POWER VIDEO CODECS

BACKGROUND OF THE INVENTION

1. Field of the Invention

This invention relates generally to video processing, and more particularly to methods and apparatus for encoding/decoding video signals.

2. Description of the Related Art

The process of recording a motion picture involves the acquisition of video images, which typically involves the sampling of an otherwise continuous flow of information. For example, video imagery is frequently sampled at a rate of twenty four frames per second. While it might be possible to simply record or otherwise store all of the video samples, it is typically more efficient to perform some sort of digital encoding of the sampled video prior to storage on some form of media, such as a disk or hard drive. Video decoding involves a reversal of sorts of the foregoing process.

End-users are continuously seeking higher-resolution/quality video content. From the device and software designers' perspectives, the reach for high resolutions requires increasing amounts of data that must be encoded/decoded per unit time, and this ultimately leads to more power consumption to meet the real-time constraints. Portable devices that often rely on battery power and limited thermal solutions present particular design challenges.

There are many conventional techniques to lower the power consumption of video encoders/decoders. Most of these known techniques rely on varying system clock frequency (and accordingly driving voltage level and the overall power consumption) based on the input video workload or gating idle blocks. A difficulty with these conventional techniques is that most designs are based on so-called "worst case designs." In worst case designs, driving voltage and clock frequency are limited to ranges which allow the circuit in question to function normally even though all component values simultaneously assume the worst possible condition that can be caused by process variations, temperature, critical path considerations, circuit age, etc. Generous voltage and frequency margins are usually employed even within the allowed ranges. This presents a penalty in terms of power consumption.

Aggressive deployment (or better-than-worst-case) is a low power design trend, which suggests operating a digital circuit on a voltage level that is lower than its qualified minimum, and detecting/correcting the statistically-rare errors that may occur in the circuit. This technique has been proposed for a processor having Razor support. Razor is a prototype technique for dynamic voltage scaling that relies on a combination of architectural and circuit-level techniques for error detection and correction of delay path failures.

The present invention is directed to overcoming or reducing the effects of one or more of the foregoing disadvantages.

SUMMARY OF THE INVENTION

In accordance with one aspect of the present invention, a method of processing video data is provided that includes encoding or decoding the video data with a codec in aggressive deployment and correcting one or more errors in the encoding or decoding wherein the error correction includes re-encoding or re-decoding the video data in a non-aggressive deployment or generating a skip picture.

In accordance with another aspect of the present invention, a computing device is provided. The computing device includes a codec operable to encode or decode video data in aggressive deployment and logic and/or instructions to correct one or more errors in the encoding or decoding wherein the error correction includes re-encoding or re-decoding the video data in a non-aggressive deployment or generating a skip picture.

In accordance with another aspect of the present invention, a non-transitory computer readable medium that has computer readable instructions for performing a method is provided. The method includes encoding or decoding the video data with a codec in aggressive deployment and correcting one or more errors in the encoding or decoding wherein the error correction includes re-encoding or re-decoding the video data in a non-aggressive deployment or generating a skip picture.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Various embodiments of computing systems operable to encode/decode video using aggressive deployment are disclosed. One variation includes a computing system that has a video encoder/decoder and trusted logic and/or code to provide as error detection. Video data is encoded/decoded at an otherwise sub-optimal driving voltage (aggressive deployment) for power savings while the error detection logic/code looks for induced errors. Error correction techniques are then engaged. In another variant, blind error correction is applied without the necessity of error detection. Various refresh schemes may be used for blind error correction. Additional details will now be described.

Figure 1:
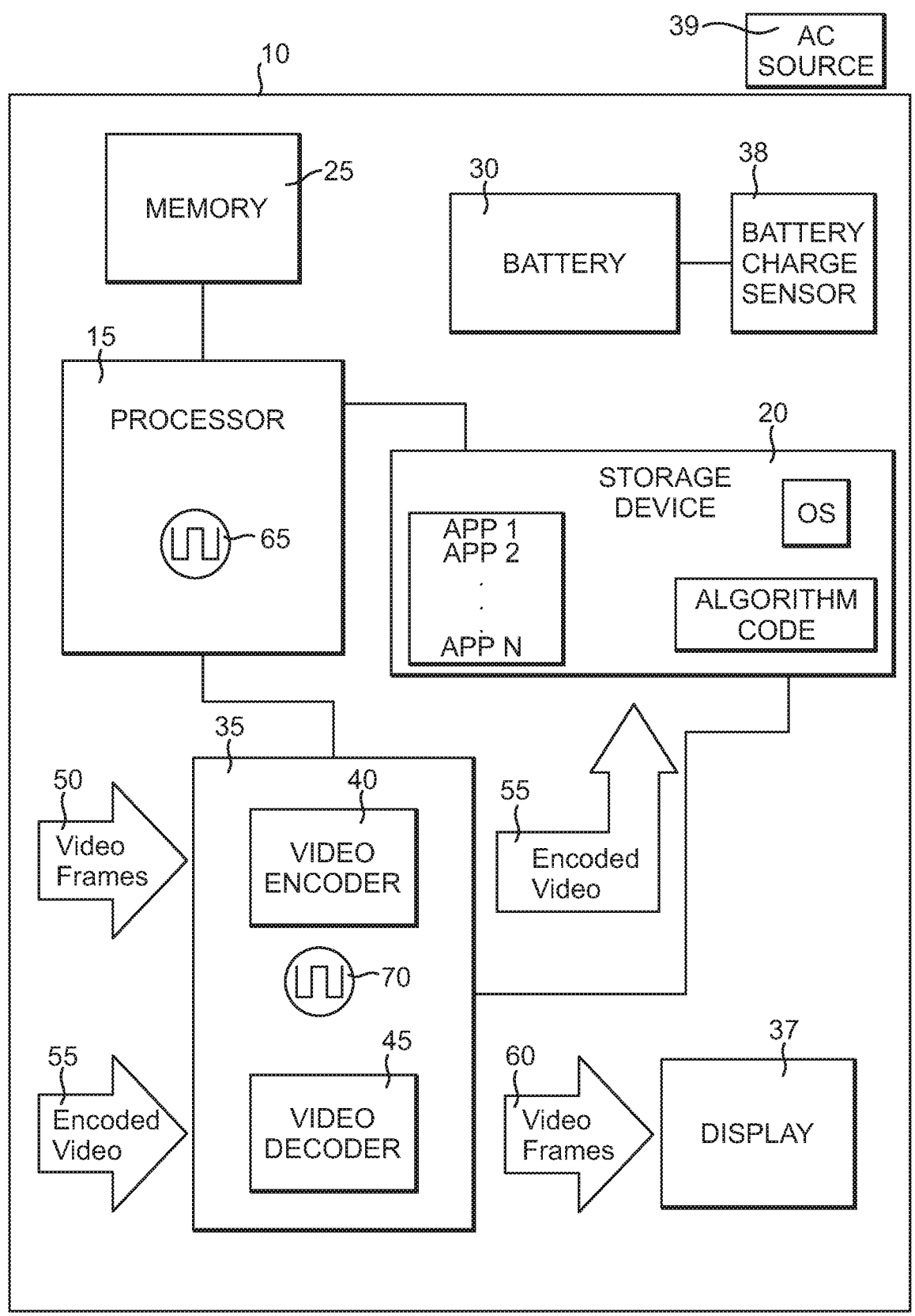
FIG. 1 is a schematic view of an exemplary embodiment of a computing device.

In the drawings described below, reference numerals are generally repeated where identical elements appear in more than one figure. Turning now to the drawings, and in particular to FIG. 1, therein is shown a schematic view of an exemplary embodiment of a computing device 10. The computing device 10 may include a processor(s) 15, a storage device(s) 20, a memory 25, a battery 30 and a coder/decoder (CODEC) 35 that is operable to encode and/or decode video data. The processor 15 may be a microprocessor (CPU), a graphics processor (GPU), a combined microprocessor/graphics processor (APU), an application specification integrated circuit or other type of integrated circuit. The storage device 20 is a non-volatile computer readable medium and may be any kind of hard disk, optical storage disk, solid state storage device, ROM, RAM or virtually any other system for storing computer readable media. The storage device 20 may be populated with plural applications, which are abbreviated APP1, APP2 . . . APPn, as well as an operating system OS and ALGORITHM CODE, which may include instructions and be designed to implement the selected behavior of the CODEC 35 to be described below. The various pieces of code may be loaded into the memory 25 as needed. Windows®, Linux, or more application specific types of operating system software may be used or the like. The memory may be DRAM, SRAM, flash, or other memory types.

It should be understood that the computing device 10 may be any of a great variety of different types of computing devices that can conduct video processing. A non-exhaustive list of examples includes camcorders, digital cameras, personal computers, game consoles, video disk players such as Blue Ray, DVD or other formats, smart phones, tablet computers, graphics cards, system-on-chips or others. But various levels of device integration are envisioned. For example, the processor 15, memory 25 and CODEC 35 could be integrated into a single circuit card or integrated circuit, such as a CPU, a GPU, an APU, a system-on-chip or other. Optionally, the CODEC 35 could be implemented as a stand-alone integrated circuit, circuit card, code or other device. An optional display 37 may be integrated into the computing device 10 or function as an external display as desired. In addition, some optional components include a battery charge sensor 38 and an AC power source 39. The battery charge sensor 38 may be a discrete integrated circuit or a component of another portion of the computing device such as, for example, the processor 15.

It should understood that various levels of device integration are envisioned as well for the CODEC 35. All or part(s) of CODEC 35 may be a stand-alone integrated circuit, part of the processor 15 or other integrated circuit of the computing device 10 or be implemented as software in the form of a driver or other type of assemblage of code stored on or off the computing device 10. The CODEC 35 may include a video encoder 40 and a video decoder 45. The video encoder 40 is operable to receive video data in the form of video frames 50 or otherwise from some source, which may be a camera, a streaming source or other source of video frames. The video encoder 40 is operable to process the video frames 50 and generate encoded video 55, which may be delivered to the storage device 20 or to some other location. The video decoder 45 is operable to receive the encoded video 55 from, say, the storage device 20 or from some other source, such as a streaming source or external storage device such as a DVD drive or some other system. The video decoder 45 is operable to decode the encoded video 55 and deliver video frames 60 to, for example, the display 37.

Various of the devices/blocks of the computing device 10 may include one or more internal clocks. For example, the processor 15 may include a clock(s) 65 and the CODEC 35 may include a clock(s) 70. The clocks 65 and 70 may operate at various frequencies, and as described in more detail below, may be overclocked to achieve certain advantages.

Figure 2:
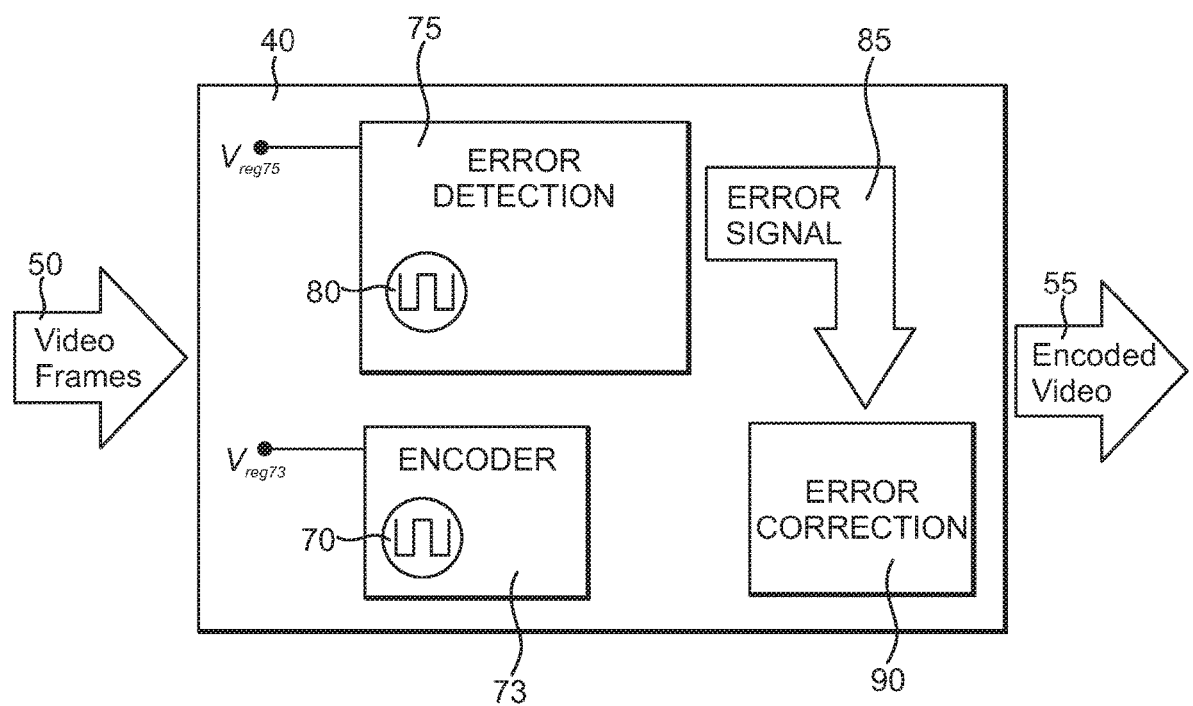
FIG. 2 is a schematic view of an exemplary embodiment of a video encoder.

Additional details of an exemplary embodiment of the video encoder 40 may be understood by referring now to FIG. 2, which is a schematic view. The video encoder 40 includes an encoder 73 that is operable to any encode using any of a great variety of encoding technologies, such as, for example Blue Ray, DVD or others. Such techniques may leverage standards like Advanced Video Coding, High Efficiency Video Coding, AMPEG or others. The encoder 73 may include various stages (not shown) to facilitate data compression. Examples include a prediction stage, an entropy coding stage, quantization stages or others. The encoder 73 may receive clock signals from the internal clock 70 operating at some frequency $f_{73}$ and have a regulated voltage input $V_{reg73}$. As described in more detail below, $V_{reg73}$ may be set at an aggressive deployment level in order to save power. Aggressive deployment is also known as "Better-than-worst-case (BTWC) design." As noted above in the Background section, in worst case designs, driving voltage and clock frequency are limited to ranges which allow the circuit in question to function normally even though all component values simultaneously assume the worst possible condition that can be caused by process variations, temperature, critical path considerations, circuit age, etc. Thus, the encoder 40 is normally driven at $V_{worstcaselow} < V_{reg73} < V_{worstcasehigh}$ where $V_{worstcaselow}$ and $V_{worstcasehigh}$ are the worst case low and high driving voltages, respectively, and at $f_{worstcaselow} < f_{73} < f_{worstcasehigh}$ where $f_{worstcaselow}$ and $f_{worstcasehigh}$ are the low and high worst case clock frequencies, respectively. Furthermore, $V_{reg73}$ and $f_{73}$ are set with comfortable margins. However, during aggressive deployment, the voltage $V_{reg73}$ and/or the frequency $f_{73}$ may be moved out of their worst case ranges. For example, $V_{reg73}$ may be lowered below $V_{worstcaselow}$ and the frequency $f_{73}$ may be kept at some steady value $f_{worstcaselow} < f_{73} < f_{worstcasehigh}$. In another option that represents a boost mode, i.e, an overclocking mode, the frequency $f_{73}$ may be raised above $f_{worstcasehigh}$ while $V_{reg73}$ is kept within $V_{worstcaselow} < V_{reg73} < V_{worstcasehigh}$ or perhaps lowered within the range $V_{worstcaselow} < V_{reg73} < V_{worstcasehigh}$ to accompany the increase in $f_{73}$. Because lowering the voltage $V_{reg73}$ below some known stable level $V_{worstcaselow}$ and/or raising the frequency $f_{73}$ above some know stable level $f_{worstcasehigh}$ introduces the possibility of errors in the encoding of the video frames 50 and delivery of the encoded video 55, the video encoder 40 or other location may be provided with error detection logic 75. The error detection logic 75 may have a regulated voltage input $V_{reg75}$, which is advantageously selected to be a known safe or non-risky voltage level or set of levels. The error detection logic 75 may receive clock signals from an internal clock 80 which may operate at some frequency $f_{75}$, which again may be varied. The error detection logic 75 optionally may be clocked by some other clock. The error detection logic 75 is operable to analyze the encoded video 55 for errors when encoded by the encoder 73 in an aggressive deployment mode and in response to that analysis generate an error signal 85, which may then be delivered to error correction logic 90. The encoded video 55 may be error corrected or not depending on the error signal 85.

The error detection logic 75 depicted in FIG. 2 may take on a variety of different forms. In an exemplary embodiment depicted schematically in FIG. 3, the error detection logic 75 may include a cache 95 or other type of storage device that has a data connection 100 to the encoder 73. It should be noted that the cache 95 may be located in a wide variety of locations, including in the processor 15 shown in FIG. 1, or in the encoder 73 or other locations, and may consist of more than one cache or storage device. An output 105 of the cache 95 and an output 110 of the encoder 73 are passed first through a scaling logic 115 and then into a comparator 120. The video frames 50 are delivered both to the cache 95 and the encoder 73. The encoder 73 is instructed to encode the video frames 50 first at reduced resolution and with $V_{reg73}$ and the clock 70 at aggressive deployment values. That reduced resolution encoded video data 122 is then sent to the cache 95. Next, the encoder 73 retrieves the unencoded video frames 50 from the cache 95 and again encodes them at a regular resolution, which may be full or other resolution, and with $V_{reg73}$ and the clock 70 at safe values. The cache 95 then delivers at the output 105 the reduced resolution, aggressive deployment encoded data and the encoder 73 delivers at the output 110 regular resolution, safe deployment encoded video data 123. The scaling logic 115 is operable to scale either or both of the outputs 105 and 110 to adjust for the differing resolutions of the encoded data so the comparator 120 can make a useful comparison. The comparator 120 compares and looks for unexpected or sudden changes between the two outputs 105 and 110. Such changes would indicate that the encoding with $V_{reg73}$ and the clock 70 in aggressive deployment has produced one or more errors. In this circumstance, the error signal 85 will reflect those errors.

It is possible to facilitate the identification of frame-to-frame changes that are suggestive of errors/corruption in the encoding and/or decoding process by utilizing signatures. For example, successive frames may each be encoded with a signature, in the form of a check redundant code (CRC) or otherwise and those signatures then compared to scan for changes in the signatures. This could be performed using the low followed by regular resolution techniques just described or just with regular resolution encoding/decoding. Canaries (pre-determined simplified patterns) may be used with or in lieu of signatures to serve as a basis for frame-to-frame comparison.

Figure 3:
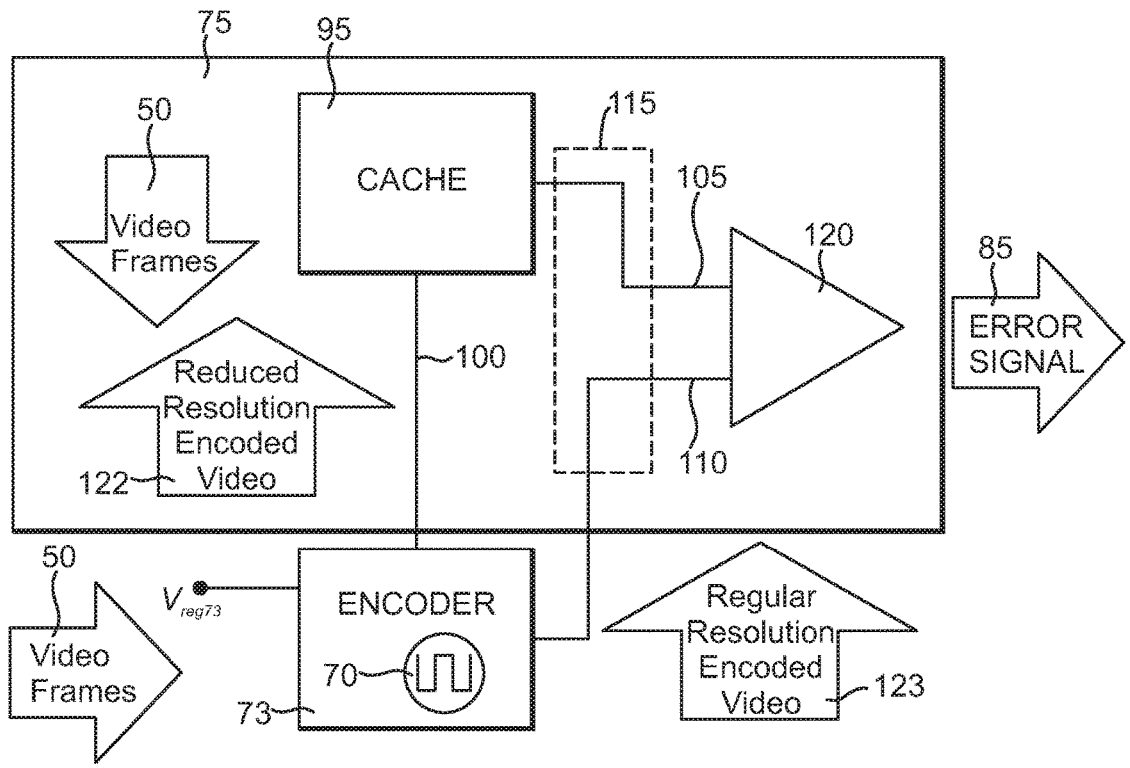
FIG. 3 is a schematic view of an exemplary embodiment of a video encoder error detection.

Still referring to FIG. 3, it is desirable to implement the error detection logic 75 in or as trusted logic so that there will be ongoing confidence in the results of the error detection operations regardless independent of whether the encoder 73 is operating in aggressive deployment. In this and any other disclosed embodiments, one way to implement trusted logic is to operate the error detection logic on a voltage plane separate from a voltage plane used for the encoder 73, and in some known safe voltage range, and/or via separate, know safe clocking. Another way involves operating the error detection logic 75 using stringent timing constraints that are selected to ensure safe operation but contain enough slack to prevent failure in overclocking situations. These represent just two examples.

In the illustrative embodiment just described, the encoder 73 is used to encode video frame 50 at both full resolution and reduced resolution. However, the skilled artisan will appreciate that the technique may be practiced by using two encoders 73 in parallel with one operating a full resolution and the other at reduced resolution and safe values of $V_{reg73}$. In other words, the cache 95 may be replaced with another encoder 73. The scaling logic 115 and comparator 120 would function as just described to generate the error signal 85.

Figure 4:
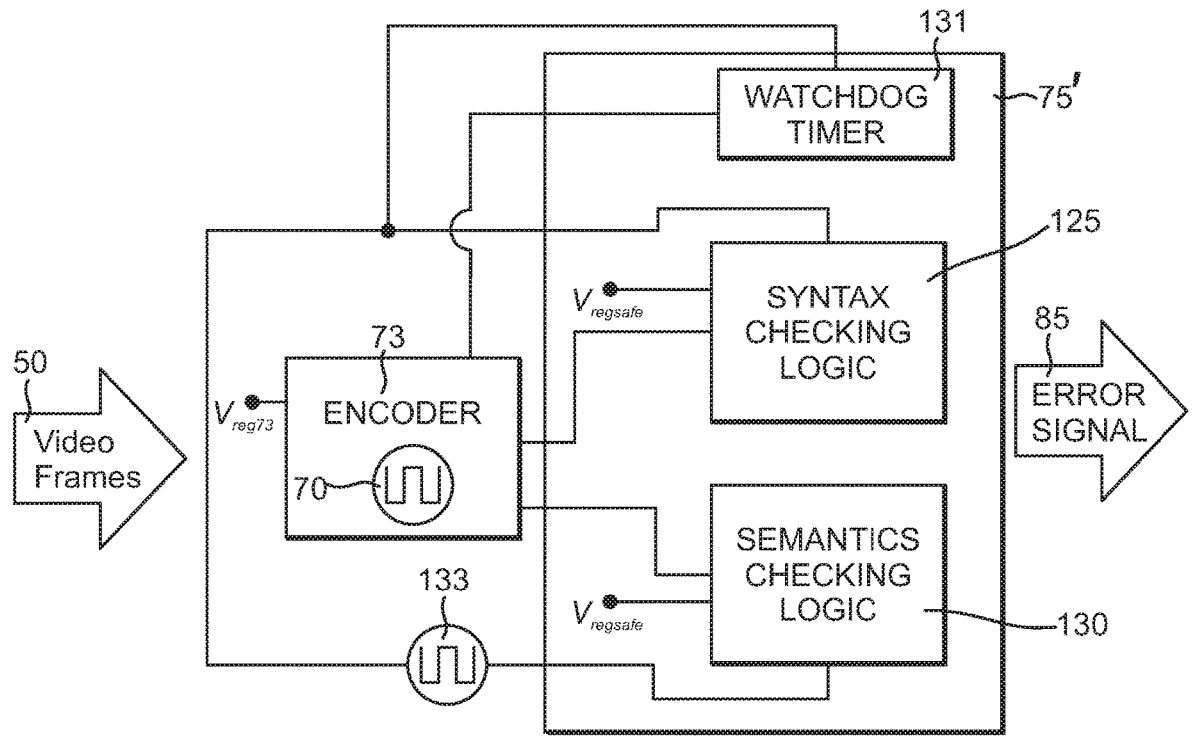
FIG. 4 is a schematic view of an alternate exemplary embodiment of a video encoder error detection.

Another exemplary embodiment of the error detection logic 75' may be understood by referring now to FIG. 4, which is a schematic view. Here, the error detection logic 75' may include, individually or in combinations, syntax checking logic 125, semantic checking logic 130 and a watchdog timer 131. The encoder 73 may be operated with $V_{reg73}$ and the clock 70 in aggressive deployment to encode the video frames 50. The syntax checking logic 125 is connected to, and operable to detect non-conformant bit streams from, the encoder 73. The semantic checking logic 130 is connected to, and operable to detect failures in, the prediction processes (i.e., of the prediction stage, not shown) of the encoder 73. The watchdog timer 131 is operable to time encoding operations by the encoder 73 and trigger the error signal 85 in the event the duration of a given encoding operation exceeds some threshold that is indicative of a hang. The syntax checking logic 125, the semantic checking logic 130 and the watchdog timer 131 may consist of or otherwise be implemented as trusted logic of the type discussed above. Again the error detection logic 75' delivers the error signal 85 as an output.

Figure 5:
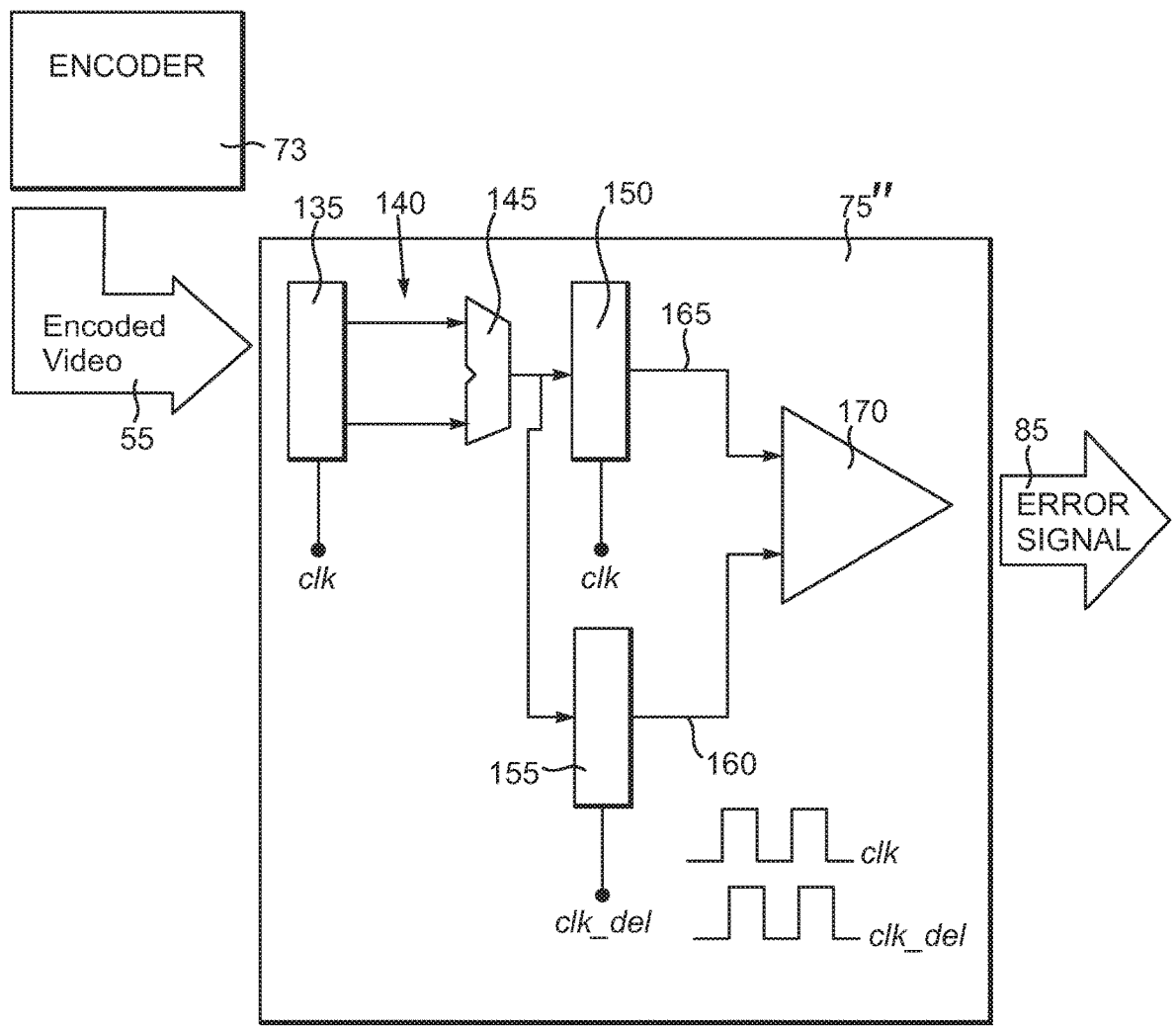
FIG. 5 is a schematic view of another alternate exemplary embodiment of a video encoder error detection.

As mentioned elsewhere herein, the error detection logic may take on a great variety of different forms. Another exemplary embodiment of the error detection logic 75" is depicted schematically in FIG. 5. Here, the error detection logic 75" may include a flip-flop 135 (or series of flip-flops) which receives encoded video 55 from the encoder 73. The flip-flop 135 provides outputs 140 to an adder 145 or other combinatorial logic. The output of the adder 145 is delivered to another flip-flop 150 and also to a shadow latch 155. The flip-flops 135 and 150 may be clocked with clock signal clk. However, the shadow latch 155 is clocked with a clock signal clk_del that is phase shifted relative to clock signal clk. The timing of signals clk and clk_del are shown schematically. The output 160 of the shadow latch 155 and the output 165 of the flip-flop 150 are delivered to a comparator 170. The comparator 170 compares the time shifted outputs 165 and 170 to look for sudden changes that are indicative of errors in the encoded video 55. The error signal 85 is the output of the comparator 170.

Figure 6:
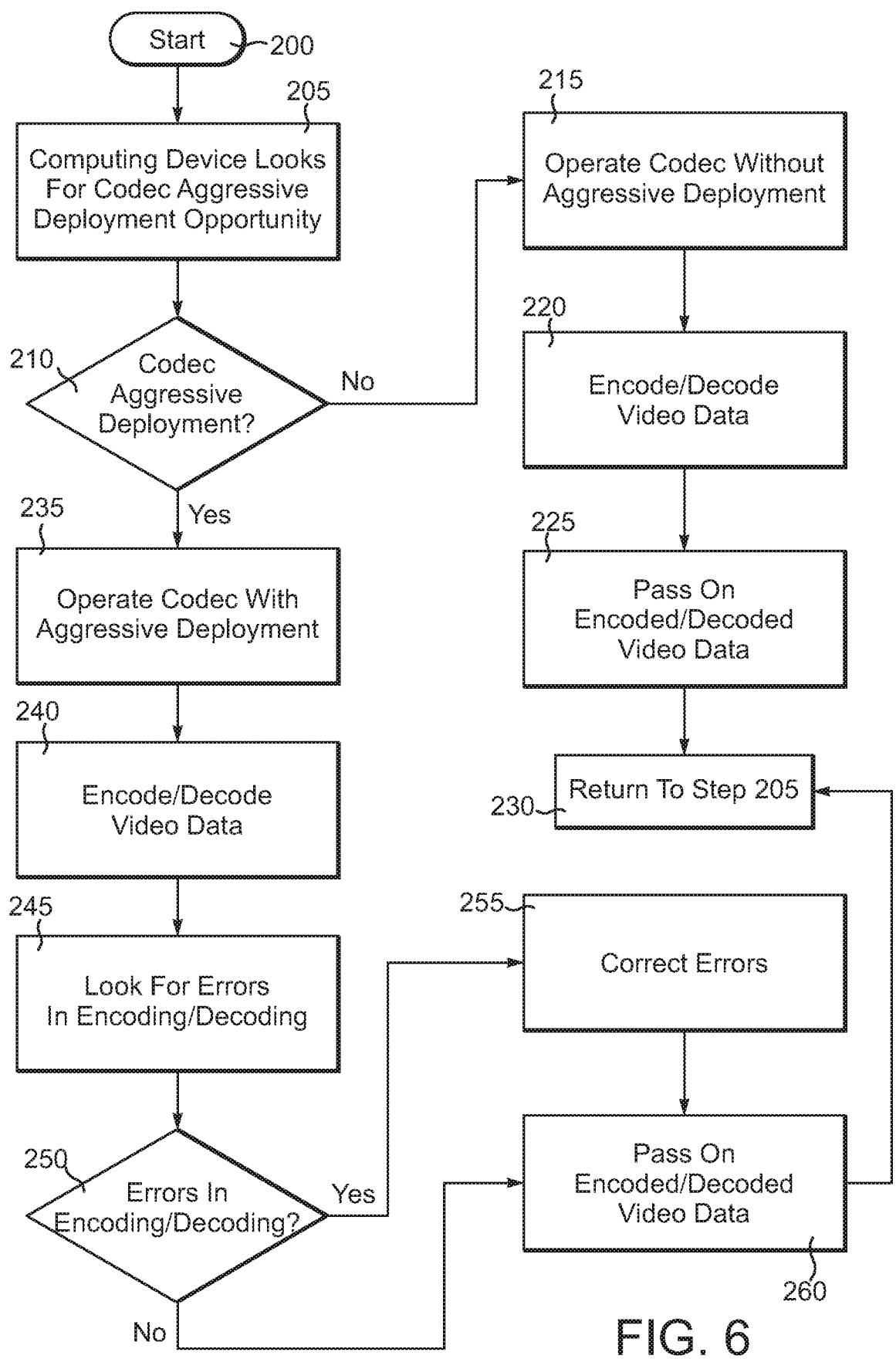
FIG. 6 is a flow chart depicting an exemplary video encoding/decoding process with error detection and correction.

An exemplary process flow for operation of the CODEC 35 may be understood by referring now to FIG. 1 and to the flow chart depicted in FIG. 6. After start at step 200, the computing device 10 looks for an opportunity for aggressive deployment of the CODEC 35. A variety of factors may be considered, such as the charge level of the battery 30 or the computational intensiveness of the video frames 50. Software, for example the OS, the ALGORITHM CODE, a plug in or other type of code, may determine if the charge level of the battery 30 is below some threshold using, for example, the battery charge sensor 38. Temperature is another factor that may be considered. For example, if the temperature of the processor 15 or the computing device 10 in general shown in FIG. 1 climbs above some threshold, then aggressive deployment may be indicated as a measure to lower heat generation. If a CODEC aggressive deployment opportunity is not seen at step 210, the process proceeds to step 215 and the CODEC 35 is operated without aggressive deployment. Optionally, the user may override the automatic entry/exit from aggressive deployment. Next at step 220, the CODEC 35 encodes/decodes the video data. At step 225, the CODEC 35 passes on the encoded/decoded video data. This may mean storage, delivery to the display 37 or some other location. At step 230, the process returns to step 205. If, on the other hand, a CODEC aggressive deployment opportunity is seen at step 210, the process proceeds to step 235 and the CODEC 35 is operated with aggressive deployment. At step 240, the video data is encoded/decoded with aggressive deployment of the CODEC 35. At step 245, error detection using any of the embodiments of error detection logic 75, 75' or 75" and techniques disclosed herein accompanies the encoding/decoding. If errors are detected at step 250, then the process proceeds to error correction at step 255. If, however, there are no errors at step 250, then the CODEC 35 passes on the encoded/decoded video data at step 260. Again, this may involve storage, delivery to the display 37 or some other location. The process then loops back to step 230.

Figure 7:
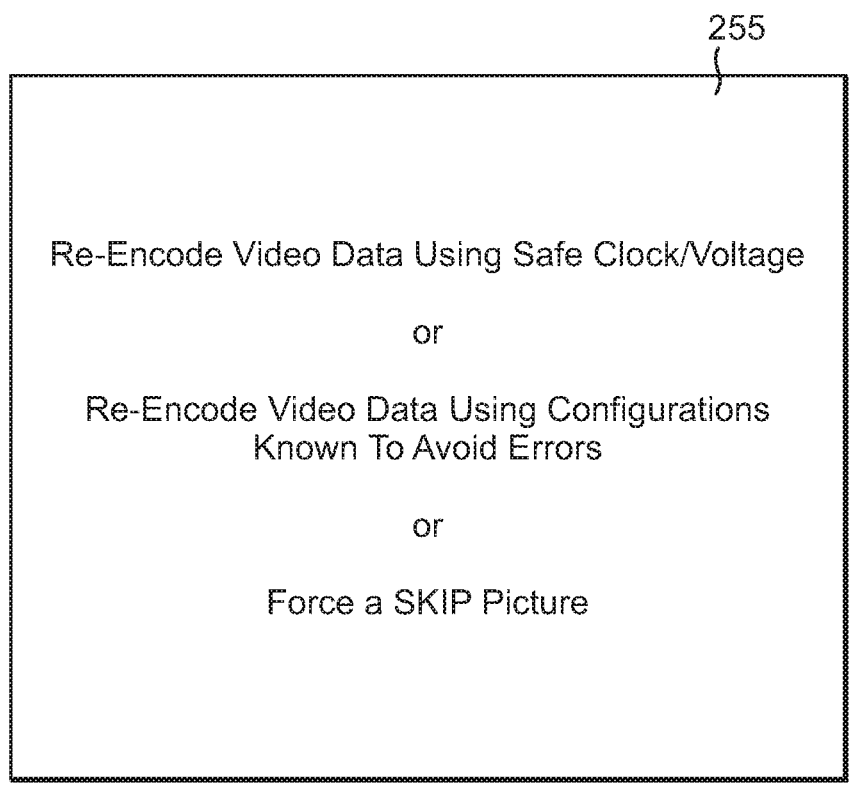
FIG. 7 is a block diagram depicting exemplary video encoding/decoding error correction.

Additional details regarding the error correction step 255 depicted in FIG. 6 may be understood by referring now also to FIG. 7, which is a schematic flow chart box depicting some exemplary error correction techniques that may be used in accordance with the disclosed embodiments. The skilled artisan will appreciate that error correction in conjunction with the encoded/decoded video data may be performed in a great variety of ways. For example, and as shown in FIG. 7, upon error detection, the video data may be re-encoded using a safe clock/voltage combination. Alternatively, the error containing video data may be re-encoded/decoded using configurations that are known to avoid errors. This may go well beyond the selection of driving voltage and clock frequency and include other types of video settings or decode settings such as quantization parameters, prediction settings, resolution, to name just a few. In still another variation, the error correction may be accomplished by forcing a skip picture, which simply involves repeating the most recent frame.

Figure 8:
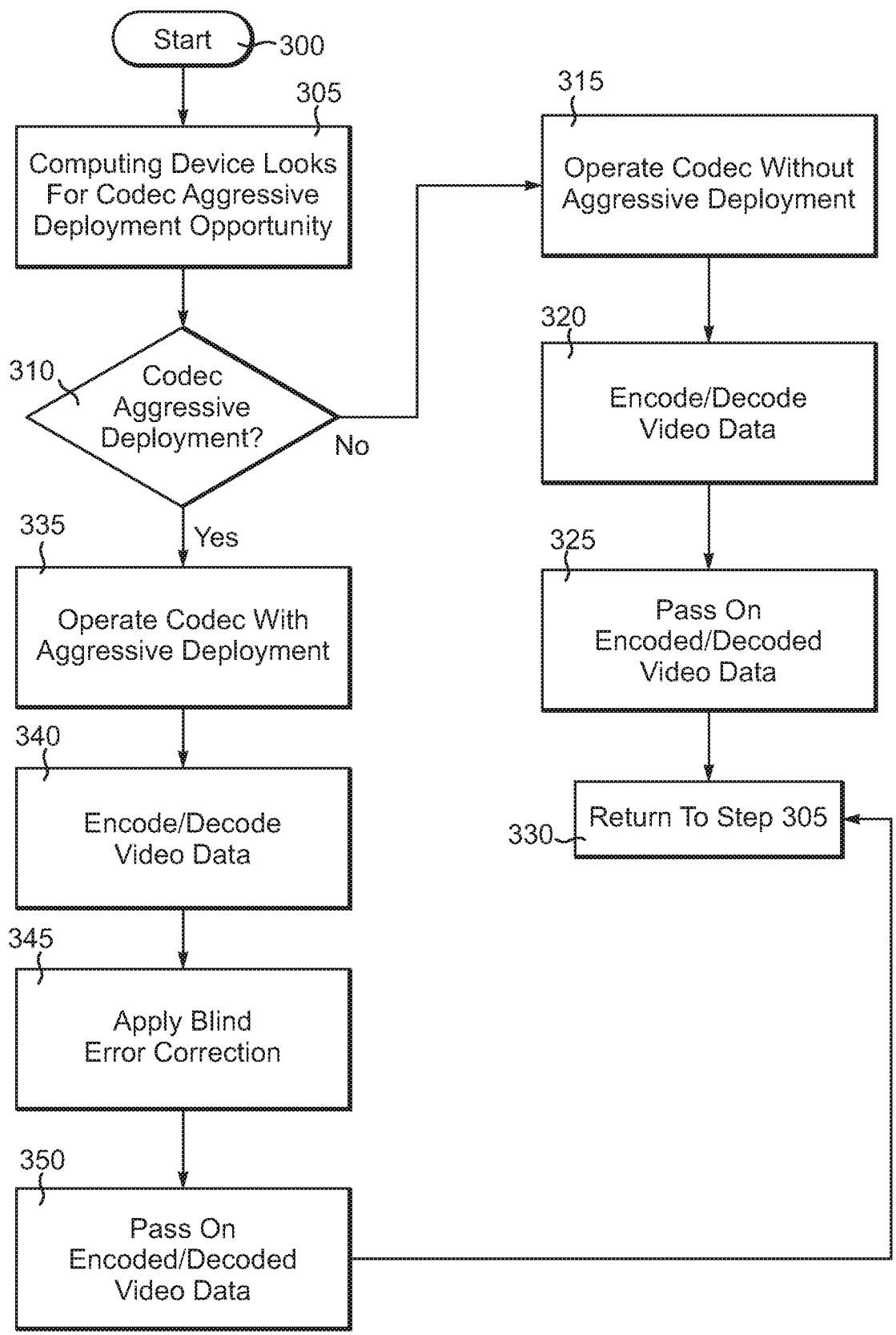
FIG. 8 is a flow chart depicting an exemplary video encoding/decoding process with error correction.

An alternate exemplary process flow for the operation of the CODEC 35 may be understood by referring now to FIG. 1 and to FIG. 8, which is a flow chart. This exemplary process flow shares many characteristics with the process depicted in FIG. 6 with a few notable exceptions associated with the technique to deal with error correction. After start at step 300, the computing device 10 looks for an opportunity for aggressive deployment of the CODEC 35. A variety of factors may be considered, such as the charge level of the battery 30 or the computational intensiveness of the video frames 50. Software, for example the OS or a plug in or other type of code, may determine if the charge level of the battery 30 is below some threshold value, for example, the battery charge sensor 38. If a CODEC aggressive deployment opportunity is not seen at step 310, the process proceeds to step 315 and the CODEC 35 is operated without aggressive deployment. Optionally, the user may override the automatic entry/exit from aggressive deployment. Next at step 320, the CODEC 35 encodes/decodes the video data. At step 325, the CODEC 35 passes on the encoded/decoded video data. This may mean storage, delivery to the display 37 or some other location. At step 330, the process returns to step 305. If, on the other hand, a CODEC aggressive deployment opportunity is seen at step 310, the process proceeds to step 335 and the CODEC 35 is operated with aggressive deployment. At step 340, the video data is encoded/decoded with aggressive deployment of the CODEC 35. Again, this may involve storage, delivery to the display 37 or some other location. The process then loops back to step 330. At step 345, in lieu of the error detection techniques disclosed elsewhere herein, one or more blind error correction techniques are applied to the encoded/decoded video data. Various types of blind error correction will be described in conjunction with subsequent figures. Following the application of blind error correction, at step 350 the encoded/decoded video data is passed on. Blind error correction may be performed using a variety of techniques, a non-exhaustive list includes instantaneous decoder refresh (IDR) and intra refresh techniques. Refresh involves the generation of the next frame. In IDR, the next frame is generated without prediction based on a prior frame(s). Intra refresh involves IDR refresh of selected portions of a frame.

Figure 9:
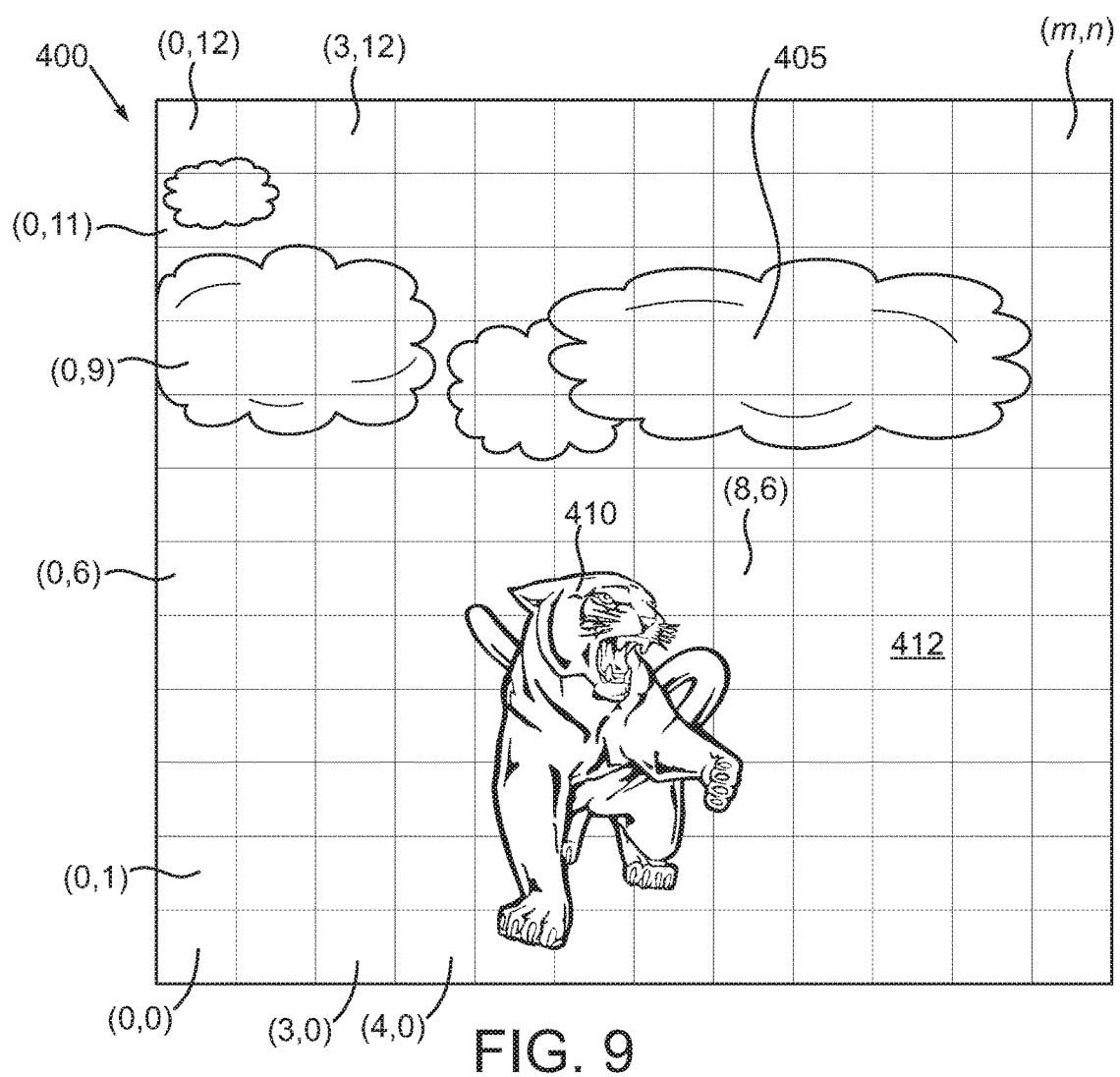
FIG. 9 is simplified video frame.
Figure 10:
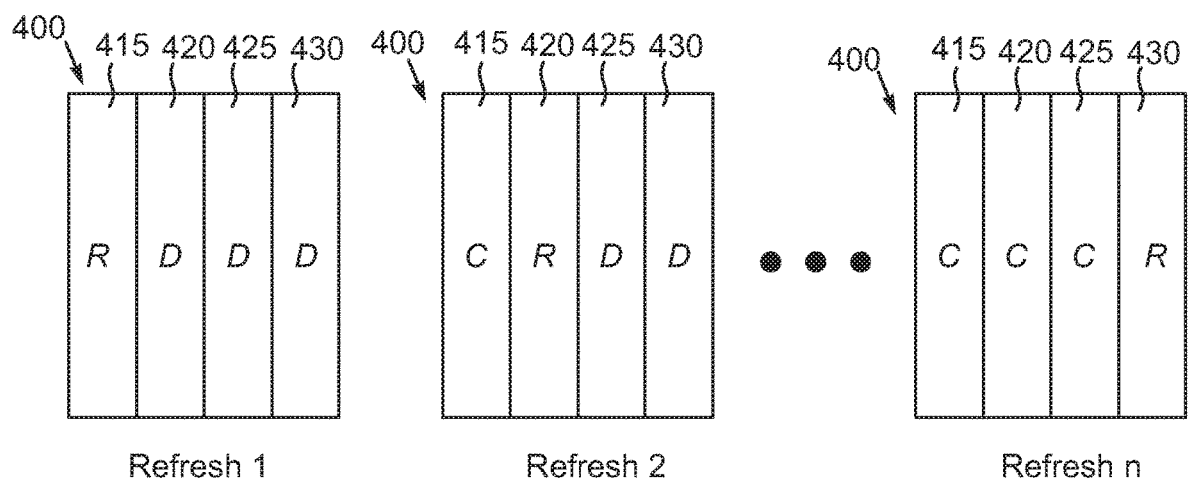
FIG. 10 is a schematic view depicting error correction through multiple refresh cycles.

An exemplary process for intra refresh may be understood by referring now to FIGS. 9 and 10. FIG. 9 depicts a single video frame 400 of a relatively simplified nature scape that includes a few clouds 405 and a big cat 410 that are in front of an otherwise pale background 412. As shown in FIG. 9, the video frame 400 consists of an array of pixels (0,0) to (m, n) where m represents the video frame width and n represents the video frame height. In this simple illustration, the pixel array (0,0) to (m, n) numbers only one hundred and forty-four pixels. However, the skilled artisan will appreciate that video displays may include much larger numbers of pixels. In this simple illustration, the clouds 405 are relatively static from frame to frame but the big cat 410 is actively moving about and thus is changing shape, size and location from frame refresh to frame refresh. The portion of the frame 400 associated with the location of the cat 410 may encompass some range of pixels, in this illustration, say pixels (4,0) to (8,6) while the more static features occupy different ranges of pixels. As illustrated in FIG. 10, for refresh purposes the frame 400 may be subdivided into plural sub-blocks. For frame refresh purposes in this illustrative embodiment, the blocks 415, 420, 425 and 430 number four and are rectangular in shape. Of course, the blocks 415, 420, 425 and 430 may be variable in number and take on a variety of sizes and shapes. To provide context for example, the block 415 may encompass the pixels (0,0) up to (3,12) for example and so on and so forth for the remaining blocks 420, 425 and 430. The letters R, D and C in FIG. 10 stand for refreshing, dirty and clean, respectively. Thus, the blocks 415, 420, 425 and 430 are shown undergoing a few successive error correcting refresh cycles Refresh 1, Refresh 2, up to Refresh n. Just prior to Refresh 1, the frame 400, and in particular the blocks 415, 420, 425 and 430, may all begin in a so-called dirty state, that is, a state in which it is merely assumed that the four blocks 415, 420, 425 and 430 may have errors. Thus at the first blind refresh, Refresh 1, block 415 is subjected to a blind refresh. Next and in Refresh 2, block 415 has already undergone refresh and is now considered a clean block while block 420 is undergoing blind refresh and blocks 425 and 430 remain dirty. Finally, in Refresh n, the blocks 415, 420 and 425 have all been blindly refreshed and the remaining block 430 is undergoing refresh to ultimately lead to the entire frame 400 being fully refreshed and thus theoretically error free. Of course, the skilled artisan will appreciate that it may be possible to break up the frame 400 into a myriad of different groups, sub-groups of different shapes, sizes, etc. For example, and referring again to FIG. 9, just the portion of the frame 400 that includes rapidly changing features, such as the cat 410 may be subject to blind error correction through refresh while those features that remain relatively static, such as the clouds 405, may not have to undergo refresh. It should be understood that the error sensing and correction techniques disclosed herein may be combined. That is, it may be possible to combine blind error correction and the active error detection and correction disclosed in conjunction with the error detection logic 75, 75' and 75".

Figure 11:
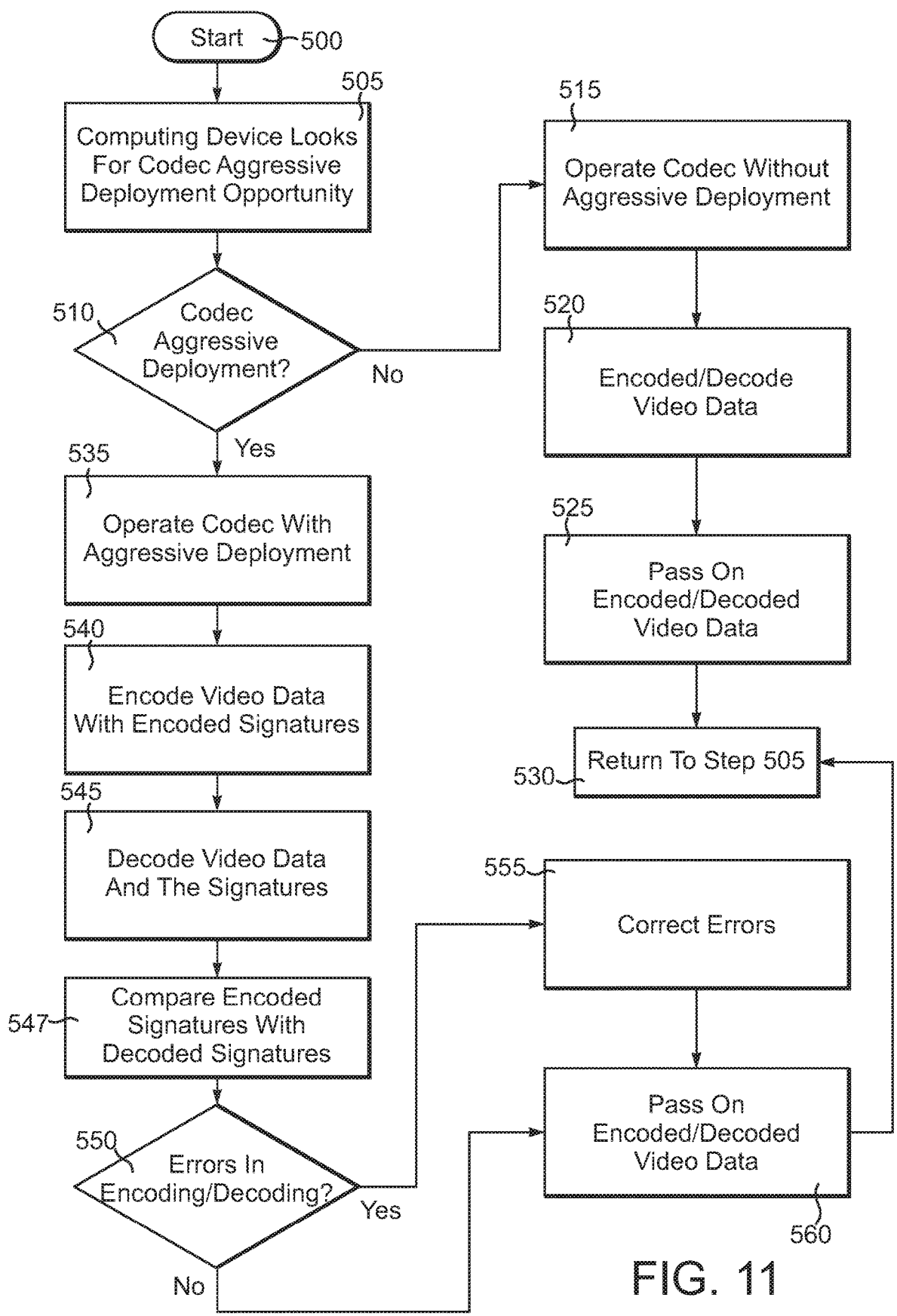
FIG. 11 is a flow chart depicting an alternate exemplary video encoding/decoding process with error detection and correction.

In the foregoing embodiments, error detection and correction generally occur at either the encoding stage or the decoding stage. In embodiments that utilize signatures, frame-to-frame signature or canary comparison may be performed. However, it is possible to operate an encoder and a decoder in tandem to perform error detection and correction in aggressive deployment situations with signatures and/or canaries. In this regard, attention is turned again to FIG. 1 and now also to FIG. 11, which is a flow chart depicting an exemplary process flow. After start at step 500, the computing device 10 looks for an opportunity for aggressive deployment of the CODEC 35. A variety of factors may be considered, such as the charge level of the battery 30 or the computational intensiveness of the video frames 50. Software, for example the OS, the ALGORITHM CODE, a plug in or other type of code, may determine if the charge level of the battery 30 is below some threshold using, for example, the battery charge sensor 38. Temperature is another factor that may be considered. For example, if the temperature of the processor 15 or the computing device 10 in general shown in FIG. 1 climbs above some threshold, then aggressive deployment may be indicated as a measure to lower heat generation. If a CODEC aggressive deployment opportunity is not seen at step 510, the process proceeds to step 515 and the CODEC 35 is operated without aggressive deployment. Optionally, the user may override the automatic entry/exit from aggressive deployment. Next at step 520, the CODEC 35 encodes/decodes the video data. At step 525, the CODEC 35 passes on the encoded/decoded video data. This may mean storage, delivery to the display 37 or some other location. At step 530, the process returns to step 505. If, on the other hand, a CODEC aggressive deployment opportunity is seen at step 510, the process proceeds to step 535 and the CODEC 35 is operated with aggressive deployment. At step 540, the video data is encoded with aggressive deployment of the CODEC 35 and with signatures (and/or canaries) of the type described elsewhere herein. At step 545, the encoded video data and signatures are decoded. At step 547, the encoded signatures and decoded signatures are compared for indicators of errors in encoding and/or decoding. Note the errors may have been produced at either the encoder (or encoder side in the event of an integrated CODEC) or the decoder (or side) or both. Step 547 may involve any of the embodiments of error detection logic 75, 75' or 75" and techniques disclosed herein. If errors are detected at step 550, then the process proceeds to error correction at step 555 using any of the disclosed embodiments. If, however, there are no errors at step 550, then the CODEC 35 passes on the encoded/decoded video data at step 560. Again, this may involve storage, delivery to the display 37 or some other location. The process then loops back to step 530.

Any of the exemplary embodiments disclosed herein may be embodied in instructions disposed in a computer readable medium, such as, for example, semiconductor, magnetic disk, optical disk or other storage medium or as a computer data signal. The instructions or software may be capable of synthesizing and/or simulating the circuit structures disclosed herein. In an exemplary embodiment, an electronic design automation program, such as Cadence APD, Encore or the like, may be used to synthesize the disclosed circuit structures. The resulting code may be used to fabricate the disclosed circuit structures.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of processing video data, comprising:
    encoding or decoding the video data with a codec in aggressive deployment; and
    correcting one or more errors in the encoding or decoding wherein the error correction includes re-encoding or re-decoding the video data in a non-aggressive deployment or generating a skip picture.

2. The method of claim 1, comprising detecting the one or more errors.

3. The method of claim 2, wherein the error detection comprises also encoding or decoding the video data in non-aggressive deployment and comparing the non-aggressive deployment encoded or decoded video data with the aggressive deployment encoded or decoded video data.

4. The method of claim 2, wherein the error detection comprises checking the video data for syntax errors or semantics errors.

5. The method of claim 1, wherein the encoding or decoding the video data is timed by a watchdog timer that is operable to time encoding or decoding operations and trigger an error signal in the event a duration of a given encoding or decoding operation exceeds some threshold that is indicative of a hang.

6. The method of claim 1, wherein the error correction comprises applying blind error correction to the video data.

7. The method of claim 6, wherein the encoded or decoded video data comprises a series of video frames and the blind error correction comprises selectively refreshing at least portions of the some of the video frames with video data encoded or decoded in non-aggressive deployment.

8. A computing device, comprising:
    a codec operable to encode or decode video data in aggressive deployment; and
    logic and/or instructions to correct one or more errors in the encoding or decoding wherein the error correction includes re-encoding or re-decoding the video data in a non-aggressive deployment or generating a skip picture.

9. The computing device of claim 8, comprising logic and/or instructions to detect the one or more errors.

10. The computing device of claim 9, wherein the error detection logic and/or instructions is operable to encode or decode the video data in non-aggressive deployment and compare the non-aggressive deployment encoded or decoded video data with the aggressive deployment encoded or decoded video data.

11. The computing device of claim 9, wherein the error detection logic and/or instructions is operable to check the video data for syntax errors or semantics errors.

12. The computing device of claim 8, wherein the computing device includes a watchdog timer to time encoding or decoding operations and trigger an error signal in the event a duration of a given encoding or decoding operation exceeds some threshold that is indicative of a hang.

13. The computing device of claim 8, wherein the error correction logic and/or instructions is operable to apply blind error correction to the video data.

14. The computing device of claim 13, wherein the encoded or decoded video data comprises a series of video frames and the blind error correction comprises selectively refreshing at least portions of the some of the video frames with video data encoded or decoded in non-aggressive deployment.

15. A non-transitory computer readable medium having computer readable instructions for performing a method processing video data, comprising:

encoding or decoding the video data with a codec in aggressive deployment; and correcting one or more errors in the encoding or decoding wherein the error correction includes re-encoding or re-decoding the video data in a non-aggressive deployment or generating a skip picture.

16. The non-transitory computer readable medium of claim 15, comprising instructions for detecting the one or more errors.

17. The non-transitory computer readable medium of claim 16, wherein the error detection comprises also encoding or decoding the video data in non-aggressive deployment and comparing the non-aggressive deployment encoded or decoded video data with the aggressive deployment encoded or decoded video data.

18. The non-transitory computer readable medium of claim 16, wherein the error detection comprises checking the video data for syntax errors or semantics errors.

19. The non-transitory computer readable medium of claim 15, wherein the error correction comprises using a watchdog timer that is operable to time encoding or decoding operations and trigger an error signal in the event a duration of a given encoding or decoding operation exceeds some threshold that is indicative of a hang.

20. The non-transitory computer readable medium of claim 15 wherein the error correction comprises applying blind error correction to the video data.

21. The non-transitory computer readable medium of claim 20, wherein the encoded or decoded video data comprises a series of video frames and the blind error correction comprises selectively refreshing at least portions of the some of the video frames with video data encoded or decoded in non-aggressive deployment.

* * * * *